United States Patent [19]

Burnett

[11] Patent Number: 5,672,442
[45] Date of Patent: Sep. 30, 1997

[54] BATTERY TERMINAL AND POST WITH ROTATION INHIBITING MEANS

[75] Inventor: Jason Todd Burnett, Toledo, Ohio

[73] Assignee: Yazaki Corporation, Tokyo, Japan

[21] Appl. No.: 717,855

[22] Filed: Sep. 23, 1996

[51] Int. Cl.$^6$ .............................. H01M 2/30; H01R 4/28
[52] U.S. Cl. .................. 429/121; 429/178; 439/754; 439/763
[58] Field of Search .................. 429/178, 179, 429/121; 439/726, 727, 754, 756, 762, 763, 907

[56] References Cited

U.S. PATENT DOCUMENTS

| | | | |
|---|---|---|---|
| 4,354,726 | 10/1982 | Kato et al. | 439/763 |
| 5,445,907 | 8/1995 | Ito et al. | 429/178 |
| 5,577,927 | 11/1996 | Okada et al. | 439/287 |

Primary Examiner—Anthony Skapars
Attorney, Agent, or Firm—Young & Basile, P.C.

[57] ABSTRACT

A battery connection comprises a battery post protruding from a battery and a battery terminal for clamping connection with the battery post. The battery post has a base and a shaft extending therefrom, and the battery terminal has a clamping ring for surrounding the shaft and a flange extending from the lower edge of the clamping ring for contacting the upper surface of the base. Alternating grooves and ridges are formed on the underside of the flange to provide increased frictional engagement with the base and so inhibit rotation of the terminal relative to the base. Alignment tabs project downwardly from the flange to engage receptacles formed in the surface of the base when the terminal is in a desired angular alignment with the base.

12 Claims, 2 Drawing Sheets

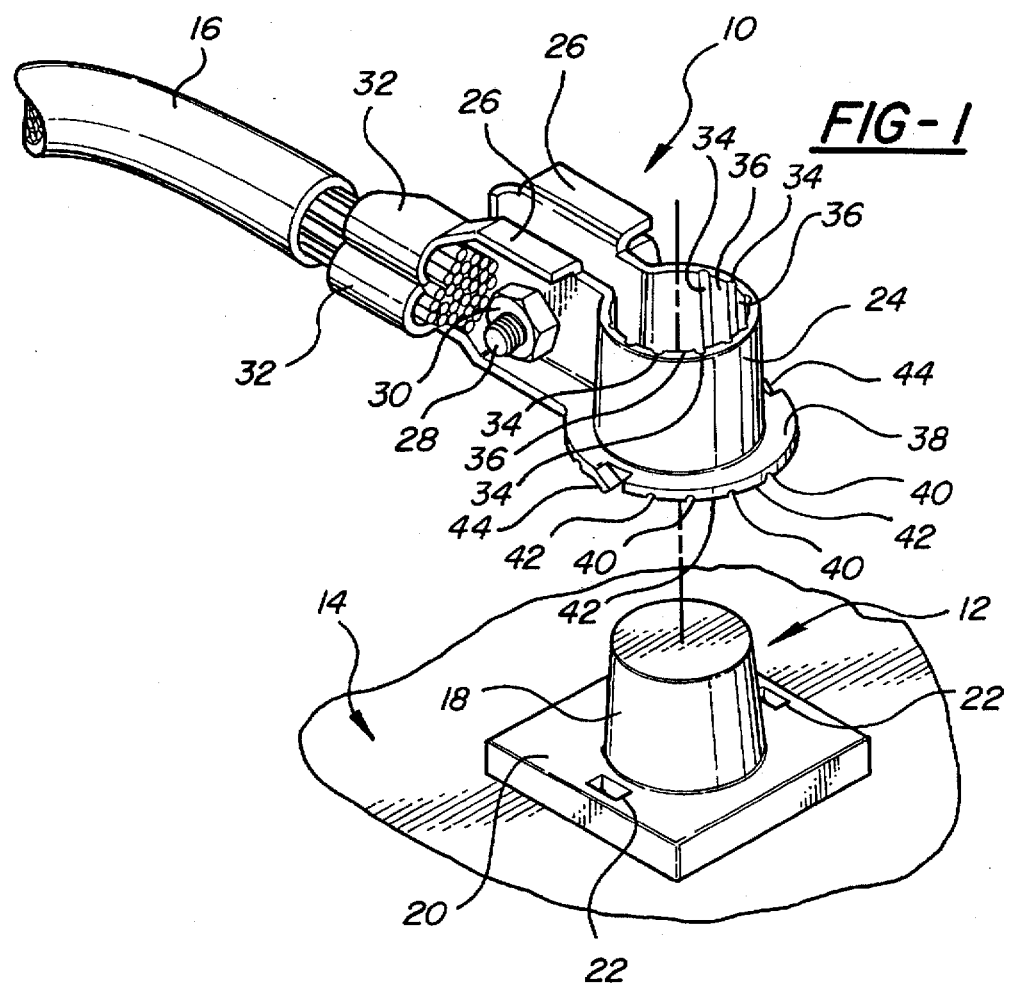
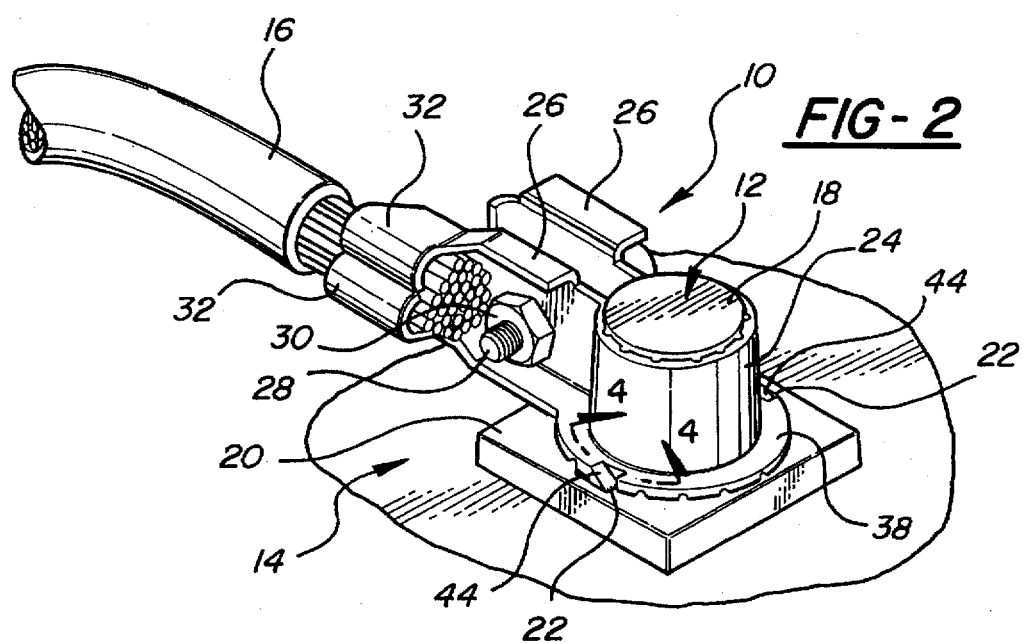

BATTERY TERMINAL AND POST WITH ROTATION INHIBITING MEANS

FIELD OF THE INVENTION

This invention relates to automotive-type batteries and to terminals for making electrical connection therewith.

BACKGROUND OF THE INVENTION

Automotive vehicles are conventionally provided with a storage battery for supplying D.C. electric current to vehicle electrical systems when the engine-driven alternator is not in operation. Electrical cables connected to these systems are typically brought together into a single main power cable for attachment to the battery, and it is well known in the art to provide on the end of this power cable a battery terminal for electrical connection to a battery post on the battery.

One common type of battery post takes the form of a cylinder or a narrowly-angled frustrum of a cone, usually fabricated from lead or a lead alloy, which projects from a surface of the battery. A battery terminal for mating with this type of battery post is typically a stamped metal component having a C-shaped clamp portion which wraps around the lateral surface of the post and a pair of parallel arms, one extending from each end of the "C." The power cable is attached to one of the arms, and a bolt passes through the two arms and is fastened with a nut which is tightened to urge the arms together. This action draws the clamp portion inward, decreasing its diameter and thus exerting a clamping force on the post.

It is important that a secure connection be maintained between the terminal and post to ensure adequate electrical continuity. If the terminal is not clamped tightly onto the post, vibration or other shocks experienced during operation of the vehicle may cause loosening of the connection and possibly a loss of electrical power to the vehicle systems.

During operational use of a battery in an automotive vehicle, it is sometimes necessary to remove the terminal from the post in order to clean the components of corrosion or other contamination. It is also sometimes necessary to disconnect the terminal from the post in order to perform maintenance or repair operations on the vehicle, or to change the battery. When the terminal is remounted to the post, it may be desirable to place it in a particular angular orientation with respect to the post and the rest of the battery so that the power cable is routed in a direction where it does not conflict with other components in the vicinity of the battery.

U.S. Pat. No. 4,354,726 discloses a battery terminal of the type described above wherein a series of alternating grooves and ribs is formed on the interior surface of the clamp portion. The raised ribs decrease the amount of area of contact between the terminal and post and thus increase the force exerted per unit area between the two components for a given degree of tightening of the bolt. This is intended to improve the electrical continuity between the battery terminal and post, as well as to increase the amount of frictional engagement between the two components so that they are less likely to move relative to one another and/or become disengaged. However, the ribs may abrade, gouge, or otherwise damage the relatively soft metal of the post if the terminal is twisted relative to the post while the clamp portion is fastened tightly to the post. Such a twisting action may occur, for example, if the terminal is tightened onto the post in an improper angular orientation with respect to the post, that is, with the arms and power cable extending away from the post in an undesirable direction, and the terminal is subsequently rotated to the desired orientation.

SUMMARY OF THE INVENTION

It is an objective of this invention to provide a battery terminal which when mounted to a battery post resists rotation relative to the post without damaging the post.

It is a further objective of this invention to provide a battery connection wherein a terminal may be quickly and repeatably mounted to a battery post in a predetermined orientation thereto.

These objectives are achieved by a battery connection comprising a battery post having a shaft portion extending generally perpendicularly from a base portion, and a battery terminal having a circular clamp portion for encircling the post shaft and an annular flange projecting radially outward from the lower edge of the clamp portion. The flange has gripping means formed on its underside to frictionally engage the upper surface of the base of the battery post when the terminal is mounted thereto, and the flange further has alignment means projecting from the underside thereof to engage complementary receptacle means formed in the base when the terminal and post are in a desired orientation relative to one another.

The frictional engagement between the gripping means and the base serves to resist relative rotation between the terminal and the post without damaging the surface of the post shaft, and the engagement between the alignment means and the receptacle means permits the terminal to be repeatably and reliably mounted to the post in the desired orientation as well as resisting rotation.

In a preferred embodiment of the invention disclosed herein, the gripping means comprises a series of radially extending ridges formed on the underside of the flange, and the alignment means comprises two tabs which project downwardly below the underside of the flange. The battery terminal is slid downward over the post until the flange contacts the upper surface of the battery post base, and the clamping ring is tightened around the shaft. In this position, the ridges contact the shaft base and provide a frictional grip to inhibit rotation of the terminal relative to the post.

BRIEF DESCRIPTION OF THE DRAWINGS

FIG. 1 is a perspective view of a battery terminal and battery post according to the present invention prior to mating;

FIG. 2 is a perspective view of the invention battery terminal and battery post mated with one another;

DETAILED DESCRIPTION OF THE PREFERRED EMBODIMENT

Figure 3:
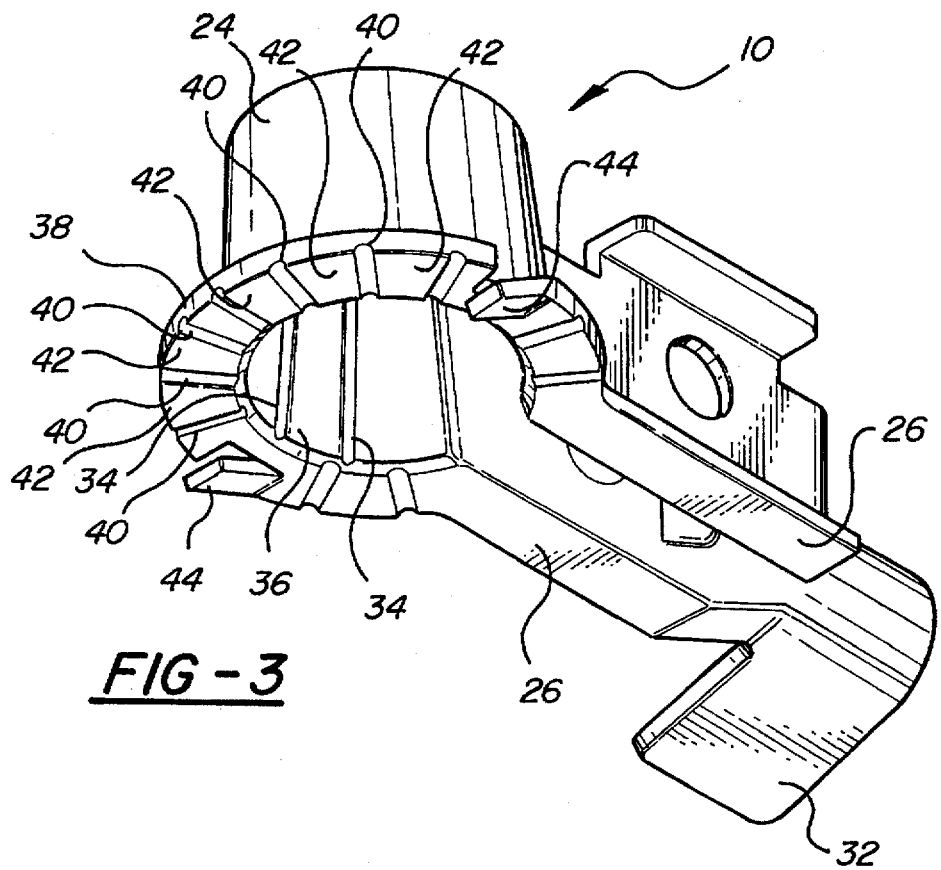
FIG. 3 is a partial perspective view showing the underside of the invention battery terminal.
Figure 4:
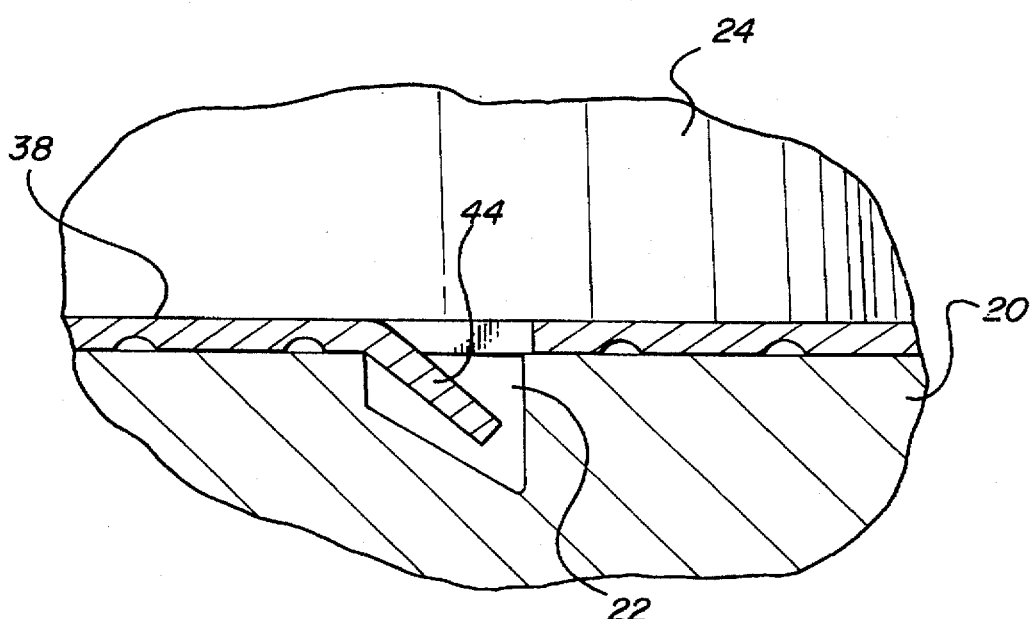
FIG. 4 is a cross-sectional view taken along lines 4—4 of FIG. 2.

Referring to FIG. 1, a battery terminal 10 and a battery post 12 according to the present invention are shown prior to being operatively connected with one another. Battery post 12 protrudes from the surface of a lead-acid storage battery 14 such as is commonly used in automotive vehicles, and battery terminal 10 is attached to a power cable 16 which is connected to the vehicle electrical system (not shown).

Battery post 12 comprises a shaft 18 in the shape of a narrowly tapered frustrum of a cone and a base 20 with a flat upper surface. A pair of recesses 22 are formed in the upper surface of base 20 on diametrically opposite sides of shaft 18. Battery post 12 is preferably cast from lead or a lead alloy, and recesses 22 may easily be formed during the casting operation.

Battery terminal 10 comprises a generally C-shaped clamping ring 24 and two parallel arms 26 extending from the opposite ends of the ring. A bolt 28 passes through holes in arms 26, and a nut 30 is threaded over the bolt so that tightening of the nut on the bolt urges the arms together and thereby draws clamping ring 24 inward, decreasing its diameter. Crimping tabs 32 are formed proximate the distal end of one of arms 26 and are wrapped around and securely crimped to power cable 16.

A series of axially extending, circumferentially spaced channels 34 are formed on the inner surface of clamping ring 24, the channels defining therebetween a plurality of inwardly protruding ribs 36. Battery terminal 10 is preferably formed by a conventionally-known stamping process from an electrically conductive metal such as brass.

An annular flange 38 extends radially outward from the lower edge of clamping ring 24. A series of radially extending grooves 40 are formed in the underside of flange 38 and define therebetween a plurality of ridges 42. Two aligning tabs 44 are located adjacent the outer edge of flange 38 at positions diametrically opposite one another with respect to clamping ring 24, the tabs projecting below the underside of the flange. As is best seen in FIG. 3, each aligning tab 44 is defined by an L-shaped cut extending inwardly from the edge of flange 38 then in a circumferential direction, the resulting section of material being bent downward at a shallow angle. Aligning tabs 44 having this configuration may be formed simultaneously with the stamping of terminal 10.

Battery terminal 10 is operatively connected to battery post 12 by sliding the terminal downward over the post shaft 18 such that alignment tabs 44 fit into recesses 22 and ridges 42 on the underside of flange 38 contact the upper surface of the post base 20, then tightening nut 30 onto bolt 28 to draw clamping ring 24 inward and urge ribs 36 into contact with the lateral surfaces of shaft 18. When battery terminal 10 and battery post 12 are so mated, the engagement between alignment tabs 44 and recesses 22 serves to allow positioning of battery terminal 10 on post 12 in only the predetermined angular orientation, and to inhibit rotation or the terminal relative to the post. The frictional contact between flange ridges 42 and the upper surface of post base 20 further serves to inhibit rotation of terminal 10 on post 12 and so eliminate the need to tighten clamping ring 24 onto the post with such force that ribs 36 may abrade or otherwise damage the lateral surface of shaft 18.

Ridges 42 may be formed with roughened bottom surfaces to increase their frictional engagement with the upper surface of the post base, since overtightening of clamping ring 24 will not urge the roughened ridges into contact with the post shaft or base in a manner that may cause damage thereto.

Recesses 22 of this configuration combine with the angled shape of alignment tabs 44 to prevents terminal 10 from being inadvertently connected to post 12 in a position 180° away from the desired angular orientation. If terminal 10 is placed over post 12 in the wrong orientation, alignment tabs 44 will not fit completely into recesses 22 and so flange 38 will not lay flush with the surface of post base 20, making it apparent that the terminal and post are improperly aligned.

Ribs 36 on the inside of clamping ring 24 may be done away with completely if desired, since the combined effect of flange ridges 42 and alignment tabs 44 is to substantially eliminate the likelihood of inadvertent rotation of terminal 10. It may still be desirable to construct the terminal with ribs on the inside of the clamping ring, however, if only so that in the event the terminal is used with a battery post having no base and no recesses for flange ridges and alignment tabs to engage, the terminal is still capable of gripping the post securely.

Whereas a preferred embodiment of the invention has been illustrated and described in detail, it will be apparent that various changes may be made in the disclosed embodiment without departing from the scope or spirit of the invention.

The invention claimed is:

1. A battery connection comprising:
   a battery post having a base and a shaft extending from the base;
   a battery terminal having a clamping ring for encircling the shaft;
   alignment means extending from one of the clamping ring and the base; and
   means disposed on the other of the base and the ring for receiving the alignment means when the terminal is in a predetermined position relative to the post.

2. A battery connection according to claim 1 wherein the alignment means comprises at least one tab formed integrally with the clamping ring.

3. A battery connection according to claim 2 wherein the means for receiving the alignment means comprises at least one recess formed in the base and configured to receive the at least one tab.

4. A battery connection according to claim 1 further comprising means projecting from the clamping ring for frictionally engaging the base to inhibit rotation of the terminal relative to the post.

5. A battery connection according to claim 4 wherein the clamping ring has a flange having an underside and the means for frictionally engaging the base comprises a series of alternating ridges and grooves formed on the underside of the flange.

6. A battery connection according to claim 1 wherein the clamping ring has an inner surface for contacting the shaft, the inner surface having means disposed thereon for gripping the shaft.

7. A battery terminal for engagement with a battery post having a base and a shaft extending from the base, the terminal comprising:
   a clamping ring for substantially encircling the shaft;
   a flange extending from the clamping ring and having an underside for contacting an upper surface of the base when the clamping ring encircles the shaft; and
   gripping means on the underside of the flange for frictionally engaging the upper surface of the base to inhibit rotation of the terminal relative to the post.

8. A battery terminal according to claim 7 wherein the gripping means comprises a series of alternating ridges and grooves.

9. A battery terminal according to claim 7 further comprising aligning means extending from the flange and engageable with the post when the terminal is in a predetermined position relative to the post.

10. A battery terminal according to claim 9 wherein the aligning means comprises one or more tabs formed integrally with the flange.

11. A battery terminal according to claim 7 wherein the clamping ring has an inner surface for contacting the shaft, the inner surface having means disposed thereon for gripping the shaft.

12. A battery connection comprising:

a battery post having a base and a shaft of generally circular cross-section extending from an upper surface of the base;

a battery terminal having a clamping ring for encircling and frictionally engaging the shaft;

an annular flange extending from the clamping ring and having an underside for contacting the upper surface of the base when the clamping ring encircles the shaft;

at least one tab extending from the underside of the flange;

at least one recess formed in the upper surface of the base for receiving the at least one tab when the terminal is in a predetermined angular position relative to the post; and a series of alternating, radially extending ridges and grooves disposed on the underside of the flange for frictionally engaging the upper surface of the base to inhibit rotation of the terminal relative to the post.

\* \* \* \* \*